March 26, 1929.　　　J. ERICKSON　　　1,706,918

KNIFE FOR CUTTING HEAVY MATERIALS

Filed July 18, 1928

Inventor
John Erickson
By his Attorneys

Patented Mar. 26, 1929.

1,706,918

UNITED STATES PATENT OFFICE.

JOHN ERICKSON, OF MINNEAPOLIS, MINNESOTA.

KNIFE FOR CUTTING HEAVY MATERIALS.

Application filed July 18, 1928. Serial No. 293,513.

My invention provides an extremely simple and highly efficient knife especially adapted for cutting sheets of fibrous insulating material, linoleum, heavy leather and the like and, generally stated, the same consists of the novel devices and combinations of devices hereinafter described and defined in the claims.

The improved knife is illustrated in the accompanying drawings wherein like characters indicate like parts throughout the several views.

Referring to the drawings.

Figure 2:
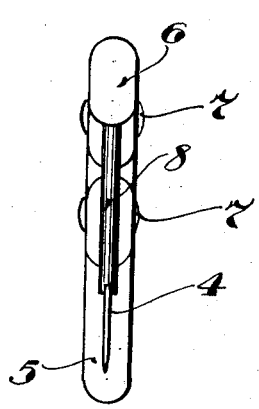
Fig. 2 is a front or edge elevation of the knife with the parts adjusted as shown in Fig. 1.

The improved knife comprises a heavy tempered steel cutting blade 4, a primary handle 5 and a secondary handle 6. The blade 4, beyond its cutting edge, is provided with an extended shank 4$^a$ to which the handles 5 and 6 are connected, as shown by nut-equipped screws 7.

Both of the handles, at their attached ends, are slit so that they receive the shank 4$^a$. The primary handle 5 is attached to the shank 4$^a$ close to the blade 4 and the bottom 5$^a$ of its slit is cut so that it lies close to the shank, as best indicated by dotted lines in Fig. 1, and thus holds the primary handle against pivotal movements. The secondary handle 6 is pivotally connected to the extreme end of the shank 4$^a$ and is capable of pivotal movement from its operative position, shown in Fig. 1, into an inoperative position shown in Fig. 3.

To limit the movement of the secondary handle 6 toward the blade 4, said secondary handle is provided with a leg or stud-like projection 8 rigidly secured thereto and adapted to bear against the back of the blade 4. Preferably the blade 4$^a$ is notched at 9 and the end of the leg 8 is notched so that it embraces the blade within the notch 9, as shown in Figs. 1 and 2.

Figure 1:
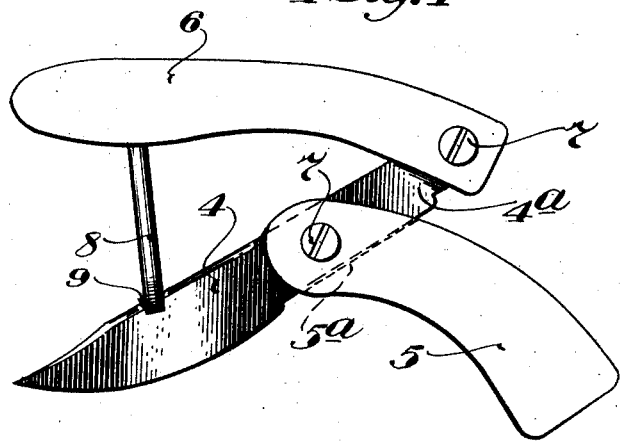
Fig. 1 is a side elevation showing the improved knife with the parts adjusted for general use.

As already indicated, Fig. 1 shows the knife adjusted for ordinary use and when thus adjusted, the primary handle 5 is adapted to be gripped by the right hand (assuming that the operator is right handed) and the secondary handle 6 is adapted to be gripped in the left hand. When the knife is thus held, the desired pressure can be produced on the handle 6 with the knife blade in an oblique position so it will produce a drawing cut and can be pulled toward the right by the hand gripping the primary handle 5. Of course, the movement of the knife will also be facilitated by pressure toward the right as well as downward by the left hand on the secondary handle 6. Obviously, the knife gripped as described can be very firmly held, very tightly pressed to its work and pulled with a powerful cutting action such as required to cut heavy fibrous insulating sheets or the like.

Figure 3:
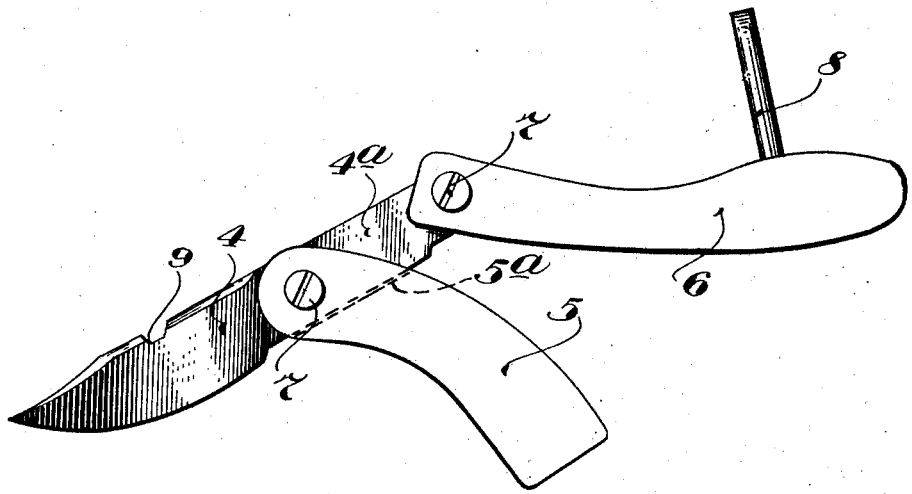
Fig. 3 is a view corresponding to Fig. 1 but with the secondary handle turned to an inoperative position.

Under some conditions it may be necessary to cut the material which is in an angle or any small space where the secondary handle 6, in its normal position, would interfere with the proper cutting action and to meet such conditions, it is only necessary to turn the secondary handle substantially into the position shown in Fig. 3.

The device described, while extremely simple and capable of being constructed at comparatively small cost, has, in actual practice been found highly efficient for the purposes had in view.

What I claim is:

1. A knife of the kind described comprising a blade, a primary handle secured to the intermediate portion thereof, and a secondary handle pivoted to the end thereof remote from the point of its cutting blade and having a device limiting its downward movement toward the back of the blade and which pivoted handle is movable toward and from said primary handle.

2. A knife of the kind described comprising a cutting blade, a primary handle attached to the intermediate portion thereof, and a secondary handle pivoted to that end of the blade that is remote from the point of its cutting edge, said blade having a projecting leg detachably engageable with the back of said blade to limit the movement of said secondary handle toward the back of the blade and which secondary handle is movable pivotally to an inoperative position.

3. The structure defined in claim 2 in which the back of said blade and the end of said leg are provided with inter-engaging notches.

In testimony whereof I affix my signature.

JOHN ERICKSON.